R. E. HELLMUND.
SYSTEM OF CONTROL.
APPLICATION FILED JUNE 15, 1917.

1,309,733.

Patented July 15, 1919.

WITNESSES:
Fred. C. Wilharm
W. R. Coley

INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,309,733. Specification of Letters Patent. Patented July 15, 1919.

Application filed June 15, 1917. Serial No. 174,884.

*To all whom it may concern:*

Be it known that I, RUDOLF E. HELLMUND, a subject of the German Emperor, and a resident of Swissvale, in the county of Allegheny and State of Pennsylvania, have invented a new and useful Improvement in Systems of Control, of which the following is a specification.

My invention relates to systems of control for electric motors and especially to the automatic disconnection of such motors from the supply circuit under predetermined conditions and the automatically reconnection thereto under subsequent modified conditions.

In previously proposed systems of control of the general class to which my invention appertains, such for example, as my copending application, Serial No. 171,166, filed May 26, 1917, various schemes for automatically governing the speed of vehicle-propelling motors and for modifying circuit conditions to prevent abnormal operation, such as overload currents, have been set forth. However, undesirable over-heating of the motors has occurred in such prior systems by reason of permitting current to traverse the motor circuits when an inappreciable amount of work was being performed, such, for example, as near the end of the accelerating period, when a relatively high balancing speed obtains and also at the termination of regenerative action when speed and current conditions may be relatively low.

It is the object of my invention to obtain the various advantages that have been afforded by analogous prior-art systems, and, in addition, to prevent the above-mentioned over-heating of the motors.

More specifically stated, it is the object of the present invention to provide automatic means for disconnecting the machine circuits from the supply circuit when the machines are consuming or producing a relatively small amount of energy and for reconnecting the machines to the supply circuit under subsequent conditions of a predetermined increase or decrease of speed.

Figure 1:
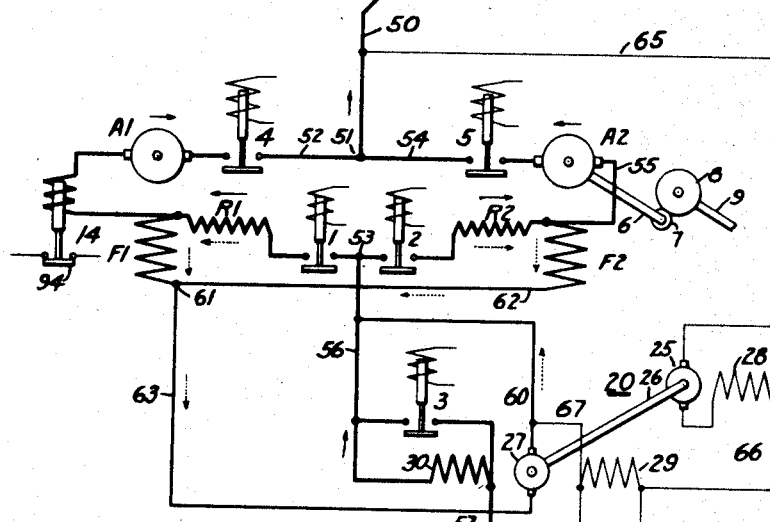
Figure 2:
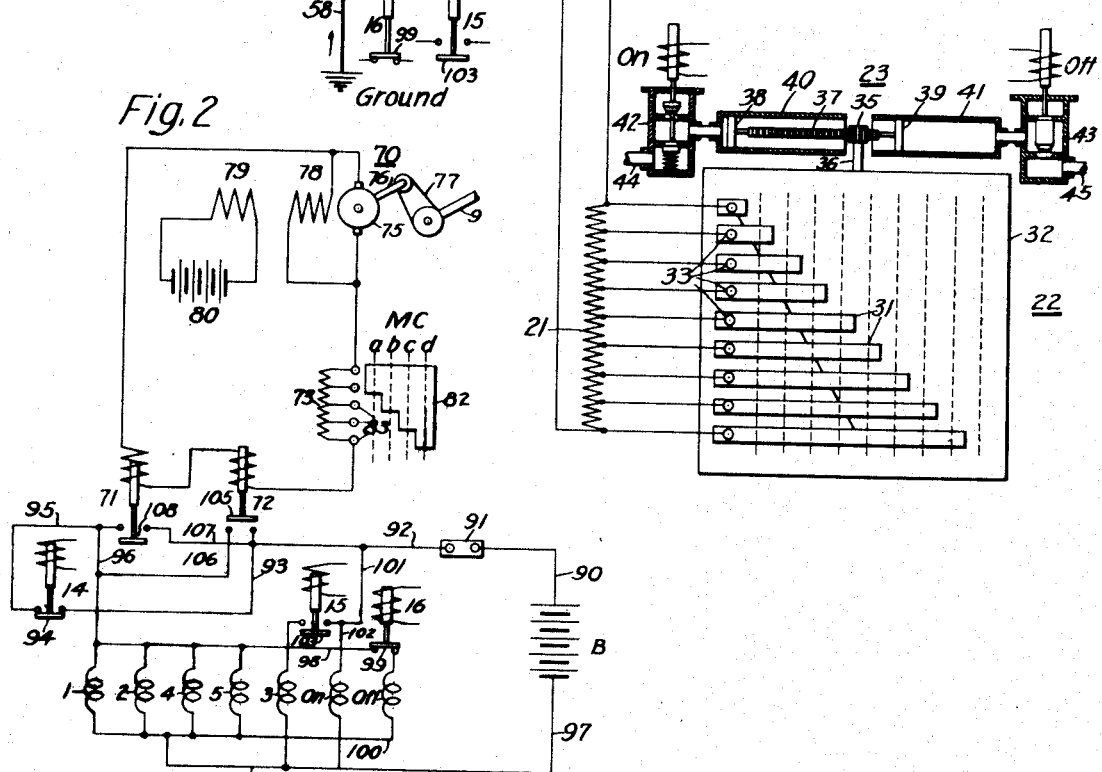

My invention may best be understood by reference to the accompanying drawing, wherein Figure 1 is a diagrammatic view of the main circuits of a system of control embodying my invention, and Fig. 2 is a diagrammatic view of an auxiliary governing system for the main machines that are shown in Fig. 1.

Referring to Fig. 1 of the drawing, the system shown comprises supply-circuit conductors "Trolley" and "Ground"; a plurality of main dynamo-electric machines respectively having commutator-type armatures A1 and A2 and field windings F1 and F2 of the series type; a plurality of stabilizing resistors R1 and R2 that are associated with the respective main-machine circuits in a manner to be described; a plurality of switches 1 to 5, inclusive, for completing certain of the machine circuits, as hereinafter set forth in detail; an auxiliary source of energy for the main field windings F1 and F2 comprising a motor-generator set 20; a plurality of dissimilar relay devices 14, 15 and 16 for performing certain automatic functions to be explained; and an auxiliary-circuit resistor 21 which is governed by a controller 22 having an operating mechanism 23, for the purpose of controlling the main-field-winding excitation.

The armature A2 is shown as provided with a shaft 6 having the familiar pinion 7 mounted thereon to mesh with a suitable gear-wheel 8 that is secured to a truck axle 9. As subsequently described in detail, in connection with Fig. 2, the truck axle 9, or its equivalent, is utilized to drive an auxiliary generator which is employed for the purpose of effecting automatic speed control of the main machines.

The motor-generator set 20 comprises a driving or motor armature 25 that is mechanically coupled, in any convenient manner, as by a shaft 26, with an exciting or generating armature 27. A series-related exciting field winding 28 is provided for the auxiliary motor armature 25, while the generating armature 27 is provided with a similarly energized field winding 29 and a second field winding 30 that is energized in accordance with the total current traversing the system, as subsequently set forth in detail.

The low-current relay device 14 has its actuating coil connected in series relation with the main armature A1 and, during normal operation, whenever the main-machine current exceeds a predetermined relatively low value, the relay device occupies its upper or circuit-closing position to maintain the closure of certain main-circuit switches, as more fully described in connection with Fig. 2.

The high-current relay device 15 has its actuating coil connected in the ground circuit of the main machines and is employed for the purpose of closing the switch 3 to short-circuit the field winding 30 for the auxiliary generator armature 17 under predetermined high-current conditions, in order to restore normal operation.

The limit switch 16 is utilized for the familiar purpose of governing the operation of the controller-actuating apparatus 23, in accordance with the value of main-machine current, as hereinafter more fully set forth.

The controller 22 carries a movable contact segment 31 that is mounted upon a drum 32 for the purpose of successive disengagement from a plurality of stationary control fingers 33 having connections to various points of the resistor 21 which, being connected in parallel relation to the auxiliary field winding 29 for the generator armature 27, serves to vary the delivered voltage thereof.

The operating mechanism 23 for the controller 22 is of a familiar electrically-controlled, pneumatically-actuated type and comprises a pinion 35 which is rigidly secured to the operating shaft 36 for the controller and is adapted to mesh with a horizontally-movable rack member 37, the opposite ends of which constitute pistons 38 and 39 that travel within suitable operating cylinders 40 and 41, respectively. A normally closed valve 42, having an actuating coil "On," is associated with the outer end of the cylinder 40, while a normally open valve 43, having an actuating coil "Off," communicates with the outer end of the cylinder 41. Fluid pressure from any suitable source (not shown) is admitted to the valves 42 and 43 through suitable pipes or passages 44 and 45, respectively.

The mechanical operation of the apparatus just described, without regard to the electrical connections effected thereby, may be set forth as follows: upon concurrent energization of the actuating coils "On" and "Off," the initial unbalanced fluid-pressure conditions, which bias the mechanism to the illustrated position, are reversed, that is, fluid pressure is admitted through the valve 42 to the cylinder 40 and is released from the cylinder 41 through the valve 43 to the atmosphere. Consequently, a movement of the pistons 38 and 39 toward the right to effect a forward actuation of the controller 22 is produced. To arrest such movement, at any time, it is merely necessary to deenergize the "off" coil, whereupon balanced high-pressure conditions immediately obtain in the two operating cylinders, and a positive and reliable stoppage of the apparatus is secured.

To produce a return movement of the mechanism, the actuating coils "On" and "Off" are concurrently deënergized, whereby fluid-pressure conditions revert to the original unbalanced state, and the desired backward movement is effected.

Assuming that switches 1, 2, 4 and 5 have been closed to effect normal accelerating or regenerative operation of the main machine, the main circuit is established from the trolley through conductor 50 to junction-point 51, where the circuit divides, one branch including conductor 52, switch 4, main armature A1, the actuating coil of the low current relay device 14, stabilizing resistor R1 and switch 1 to a second junction-point 53, and the other branch traversing conductor 54, switch 5, main armature A2, conductor 55, stablizing resistor R2 and switch 2 to the junction-point 53, whence a common circuit is continued through conductor 56, field winding 30 for the auxiliary generator armature 27, conductor 57, the acuating coils of the high-current relay device 15 and of the limit switch 16, and conductor 58 to the negative supply-circuit conductor Ground.

The main-field-winding or exciting circuit is established from the positive terminal of the auxiliary generator armature 27 through conductors 60 and 56 to the junction-point 53, where the circuit divides, one branch traversing switch 1, resistor R1 and main field winding F1 to another junction-point 61, and the other branch including switch 2, resistor R2, main field winding F2 and conductor 62 to the junction-point 61, whence a common circuit is completed through conductor 63 to the negative terminal of the auxiliary armature 27.

A further circuit is established from the positively energized conductor 50 through conductor 65, armature winding 25 and field winding 28 of the auxiliary driving motor, conductor 66, field winding 29 for the auxiliary generator armature 27 and conductors 67, 60 and 56, whence circuit is completed to the conductor Ground, as already traced.

The circuit connections just recited are not of my present invention but are fully set forth and claimed in my co-pending application, Serial No. 44,443, filed August 9, 1915. The inherent stablizing or balancing action of the resistors R1 and R2 may be briefly set forth as follows: As indicated by the solid arrows, representing main-armature or regenerated current, and the dotted arrows, denoting main-field-winding or exciting current, both these currents traverse the resistor R1 in the same direction during the regenerative period. Consequently, upon an incipient increase of the current traversing the main armature A1, the correspondingly augmented voltage drop across the resistor R1 immediately reduces, in proportion, the voltage available for delivery from the auxiliary generator armature 27 to the main field winding F1. Thus, the main-armature current is reduced to the desired normal value. The converse action takes place in the event of an incipient decrease of regenerated current. In this way, a substantially constant main-machine current is maintained, irrespective of supply-circuit voltage fluctuations and the like.

On the other hand, during accelerating operation, the main-armature current and the corresponding field-winding current traverse the resistor R1 in opposite directions. Under such circumstances, therefore, an incipient increase of main-armature current produces a decreased voltage drop in the resistor R1 and, therefore, an increase of main-field-winding voltage. Such increased excitation of the main machine correspondingly increases the counter-electromotive force of the main armature A1 and thereby reduces the current traversing the armature. The converse action occurs under conditions of an incipient decrease of the main-armature current, and thus, stable operating conditions are inherently maintained during the accelerating period also, by the illustrated circuit arrangement.

Reference may now be had to Fig. 2, wherein the auxiliary system shown comprises the actuating coils for the switches 1 to 5, inclusive, and for the operating mechanism 23, together with the coöperating contact members of the relay devices 14, 15 and 16; a battery B or other suitable source of energy for the actuating coils; and a system for automatically controlling the main-machine speed comprising an axle-driven generator 70, a high-speed relay device 71, a low-speed relay device 72 and a master controller MC having a plurality of operative positions $a$ to $d$, inclusive, for governing the active circuit value of a resistor 73, whereby the voltage of the generator 70 may be regulated.

The auxiliary generator 70 may be mechanically connected to rotate with the main machines in any suitable manner, and is here shown as having its armature 75 provided with the customary shaft 76 which is driven from the truck axle 9 through the agency of a suitable belt or chain 77. A shunt field winding 78 is provided for the armature 75 and, in addition, a constantly-excited field winding 79 is also supplied, being energized from a storage battery 80, for example.

By varying the active circuit value of the resistor 73 through suitable manipulation of the master controller MC to effect engagement of a contact segment 82 with the proper control fingers 83, the voltage of the axle-driven generator 70 may be set or adjusted to a certain value that is determined by the joint action of the variably-excited field winding 78 and the constantly-excited field winding 79, and, whenever the vehicle speed corresponding to such setting or adjustment obtains, the current traversing the actuating coils of the speed-relay devices 71 and 72 has such a value that the high-speed relay device 71 occupies its illustrated lower or open-circuit position, while the low-speed relay device assumes its depicted upper or open-circuit position. Under such circumstances, therefore, the axle-driven generator 70 does not affect the operation of the auxiliary governing system in any way, but if the speed of the vehicle, and, therefore, of the axle-driven generator, increases to a certain value by reason of the vehicle traveling down a grade, for example, the increased current traversing the actuating coil of the high-speed relay device 71 is sufficient to actuate it to its upper or circuit-closing position to complete certain circuits to be described.

On the other hand, if the vehicle speed and, therefore, the voltage of the axle-driven generator 70, decreases to a certain value, by reason of the vehicle traveling along an up grade, for instance, the reduced excitation of the low-speed relay device 72 permits it to drop to its lower or circuit-closing position to govern the same circuits as those controlled by the high-speed relay device 71.

Assuming that the main machines are normally operating during either the accelerating or the regenerating period, so that an appreciable current traverses the main machines to maintain the low-current relay device 14 in its upper position, an auxiliary circuit is established from the positive terminal of the battery B through conductor 90, manually-operated switch 91, conductors 92 and 93, coöperating stationary and movable contact members 94 of the low-current relay device 14 in its upper position, conductors 95 and 96, the parallel-related actuating coils of the switches 1, 2, 4 and 5 and conductor 97 to the negative terminal of the battery B. A further circuit is completed between the conductors 96 and 97 comprising conductor 98, coöperating contact members 99 of the limit switch 16 in its lower position, the actuating coil "Off" and conductor 100.

An additional circuit is established from the positively energized conductor 92 through conductors 101 and 102 and the actuating coil "On" to the negative conductor 97.

Since both actuating coils "On" and "Off" are energized, forward movement of the controller 22 occurs to gradually increase the active-circuit value of the shunt resistor 21 and thereby increase the voltage of the auxiliary generator 27 and, consequently, of the main field windings. The step-by-step actuation of the controller is dependent upon the limit switch 16, in accordance with a familiar practice.

If the main-machine current decreases to such a relatively low value that no appreciable work is being performed by the motors, but the machines are being needlessly overheated, then the low-current relay device 14 drops to its lower position to open the common energizing circuit of the actuating coil "Off" and of the actuating coils of the switches 1, 2, 4 and 5. Consequently, the vehicle will coast and no current traverses the main-machine circuits.

The opening of the main-circuit switches, however, will not effect actuation of the controller 22, which remains in the occupied position, since only the actuating coil "Off" is deënergized, while the actuating coil "On" remains energized. The previously-described balanced pressure conditions thus maintain the controller stationary during the coasting period.

However, if the vehicle speed should decrease to the value corresponding to the low-speed relay device 72, under the initially adjusted conditions of the master controller MC, the relay device drops to its lower position to complete a circuit from the positively-energized conductor 92 through coöperating stationary and movable contact members 105 of the relay device and conductor 106 to the conductor 96, whereby the actuating coils of the switches 1, 2, 4, 5 and the actuating coil "Off" are again energized to connect the machines to the circuit and thereby effect an increase of the machine speed through accelerating action, if necessary.

On the other hand, if relatively high-speed conditions, corresponding to the setting of the high-speed relay device 71, should obtain during the vehicle-coasting period, the relay device is actuated to its upper position, in the manner previously described, to complete a circuit from the positively-energized conductor 92 through conductor 107 and coöperating contact members 108 of the relay device to the conductor 96, to again energize the above-mentioned actuating coils, thus connecting the machines to the supply circuit and, in this way, producing a reduction of the vehicle speed through regenerative braking action, if necessary.

The closure of the main-circuit switches, by reason of changed speed conditions, will not cause an undesirable surge of voltage or current in case the machines are designed with a relatively "steep" speed characteristic, that is, if a slight increase of current inherently produces a relatively great decrease of machine speed. However, if the characteristic curve is of the opposite or "flat" type, such undesirable surges may be automatically prevented through the agency of the high-current relay device 15 and the switch 3. When the machine current rises to a certain value corresponding to the setting of the relay device 15, the lifting thereof completes a circuit from the positively energized conductor 101 (Fig. 2) through coöperating contact members 103 of the relay device and the actuating coil of the switch 3 to the negative conductor 97. Thus, the field winding 30 (Fig. 1) for the auxiliary generating armature 27 is short-circuited by the switch 3 and the resultant reduction of exciting voltage immediately effects a corresponding decrease of the main-machine current.

If the master controller MC is actuated to a different position, while the main machines are coasting, one of the speed-relay devices 71 and 72 will automatically be actuated to close the main-circuit switches in the manner previously described and thereby effect the operation of the controller 22 until the desired new average speed has been obtained, whereupon the speed relay device 71 or 72 will again assume its open position and the low-current relay device 14 will thenceforth govern the system operation.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a supply circuit and a dynamo-electric machine, of means for automatically controlling the machine speed, means for disconnecting the machine from the supply circuit under predetermined current conditions, and means for reconnecting the machine under subsequent speed conditions.

2. In a system of control, the combination with a supply circuit and a dynamo-electric machine, of means dependent upon current conditions for disconnecting the machine from the supply circuit, means dependent upon a departure from a certain speed condition for reconnecting the machine, and means governed by said second means for varying the machine speed to approach said speed condition.

3. In a system of control, the combination with a supply circuit and a dynamo-electric machine, of means dependent upon current conditions for disconnecting the machine from the supply circuit, an auxiliary armature rotatable with said machine, and means dependent upon the voltage of said auxiliary armature for reconnecting the machine.

4. In a system of control, the combination with a supply circuit and a dynamo-electric machine, of means dependent upon current conditions for disconnecting the machine from the supply circuit, an auxiliary armature rotatable with said machine, and plural independent means actuated in accordance with the voltage of said auxiliary armature for reconnecting the machine under predetermined high-speed and low-speed conditions, respectively.

5. In a system of control, the combination with a supply circuit and a dynamo-electric machine, of means dependent upon current conditions for disconnecting the machine from the supply circuit, an auxiliary armature rotatable with said machine, and a plurality of dissimilar relay devices energized from said auxiliary armature for reconnecting said machine, under predetermined high-speed and low-speed conditions, respectively.

6. In a system of control, the combination with a supply circuit and a main dynamo-electric machine having an armature and a field winding, of a relay device for disconnecting the machine from the supply circuit under predetermined low-current conditions, an auxiliary armature rotatable with the main armature, and means dependent upon the electrical condition of said auxiliary armature for reconnecting said machine.

7. In a system of control, the combination with a supply circuit and a main dynamo-electric machine having an armature and a field winding, of a relay device for disconnecting the machine from the supply circuit under predetermined low-current conditions, an auxiliary armature rotatable with the main armature, and a plurality of dissimilar relay devices energized from said auxiliary armature for reconnecting said machine under predetermined high-speed and low-speed conditions, respectively.

8. In a system of control, the combination with a supply circuit and a main dynamo-electric machine having an armature and a field winding, of an auxiliary source of energy for said field winding, a plurality of electrically-controlled switches for connecting the machine to the supply circuit and for connecting said source to the field winding, a relay device for effecting the opening of said switches under predetermined low-current conditions, an auxiliary armature rotatable with the main armature, and a plurality of dissimilar relay devices energized from said auxiliary armature for reclosing said switches under predetermined high-speed and low-speed conditions, respectively.

9. In a system of control, the combination with a supply circuit and a main dynamo-electric machine having an armature and a field winding, of a relay device for disconnecting the machine from the supply circuit under predetermined low-current conditions, an auxiliary armature rotatable with the main armature, a substantially constantly-excited and a variably-excited field winding for the auxiliary armature, and plural independent means actuated in accordance with the auxiliary-armature voltage for reconnecting the machine under predetermined high-speed and low-speed conditions, respectively.

10. In a system of control, the combination with a supply circuit and a dynamo-electric machine, of means dependent upon predetermined electrical conditions of said machine for interrupting certain machine circuits, means dependent upon a departure from a predetermined speed condition of said machine for reclosing said circuits, and means governed by said second means for increasing or decreasing the machine speed to approach said speed condition.

11. In a system of control, the combination with a supply circuit and a dynamo-electric machine, of means dependent upon predetermined current conditions of said machine for interrupting certain machine circuits, means dependent upon a departure from a certain speed condition of said machine for reclosing said circuits, and means governed by said second means for varying the machine speed to approach said speed condition.

12. In a system of control, the combination with a supply circuit and a dynamo-electric machine, of means dependent upon predetermined low-current conditions for disconnecting the machine from the supply circuit, and means dependent upon a departure of the machine speed in either direction from a predetermined value for reconnecting the machine.

13. In a system of control, the combination with a supply circuit and a dynamo-electric machine, of means dependent upon predetermined low-current conditions of said machine for interrupting certain circuits, and means dependent upon a departure of the machine speed in either direction from a predetermined value for reestablishing said circuits.

14. In a system of control, the combination with a supply circuit and a dynamo-electric machine, of means dependent upon predetermined current conditions of said machine for interrupting certain circuits, means for reestablishing said circuits when the machine speed exceeds a certain limit, and means governed by said second means for subsequently reducing the machine speed.

15. In a system of control, the combination with a supply circuit and a dynamo-electric machine, of means dependent upon predetermined current conditions of said machine for interrupting certain circuits, means for reestablishing said circuits when the machine speed goes below a certain limit, and means governed by said second means for subsequently increasing the machine speed.

16. In a system of control, the combination with a supply circuit and a dynamo-electric machine having an armature and a field winding, of an auxiliary source of energy for said field winding, a relay device for disconnecting the machine from the supply circuit under predetermined low-current conditions, a plurality of dissimilar relay devices energized in accordance with the machine speed for reconnecting said machine under predetermined high-speed and low-speed conditions, respectively, and means governed by said dissimilar relay devices for varying the effect of said auxiliary source to cause the machine speed to approach a mean speed value.

In testimony whereof, I have hereunto subscribed my name this 29th day of May, 1917.

RUDOLF E. HELLMUND.